OR 3,651,498 78

United Stat

Magill et al.

[15] 3,651,498

[45] Mar. 21, 1972

[54] HOLOGRAPHIC STORAGE AND RETRIEVAL SYSTEM

[72] Inventors: Peter J. Magill, Endwell; Robert E. McCurry, Vestal; Charles A. Speicher, Endwell, all of N.Y.

[73] Assignee: International Business Machines Corporation, Armonk, N.Y.

[22] Filed: Mar. 2, 1970

[21] Appl. No.: 15,542

[52] U.S. Cl. ..........340/174.1 M, 340/146.3 P, 350/151, 340/173 MA

[51] Int. Cl. ..........G11c 11/14

[58] Field of Search ..........340/146.3 P, 174 YC, 173 LM, 340/174.1 MO, 173 LT, 173 MA, 174 TF, 174.1 M; 350/3.5, 156, 150, 151

[56] References Cited

UNITED STATES PATENTS

| | | | |
|---|---|---|---|
| 3,500,361 | 3/1970 | Cushner | 340/174.1 |
| 3,425,770 | 2/1969 | Mueller et al. | 340/146.3 |

OTHER PUBLICATIONS

IBM Tech. Discl. Bull' n., Vol. 11, No. 12, May 1969, page 1636, entitled "Multiple Hologram Readout to Single Diode Array," by Tait and Taras.

*Primary Examiner*—Thomas A. Robinson
*Attorney*—Hanifin and Jancin and Andrew Taras

[57] ABSTRACT

Random selection of holograms from an array comprised of a plurality of holograms is achieved by light reflections from the selected holograms upon illuminating the entire array with a broad beam of coherent light. The array of discrete holograms is overlaid with a reflective magnetizable film, normally uniaxially oriented. When the magnetization vector in the film is rotated in any one or more of the discrete hologram areas, a proportional rotation in the plane of polarization of the reflected light will occur and be directed to a readout diode array. Disposed in the path of the reflected light is an analyzer which is set for maximum extinction when no readout is desired and minimum extinction when a readout is desired, the diode array providing electrical readout signals corresponding to the information read out from the selected hologram.

6 Claims, 2 Drawing Figures

*INVENTORS*
PETER J. MAGILL
ROBERT E. McCURRY
CHARLES A. SPEICHER
*BY* [signature]
*AGENT*

HOLOGRAPHIC STORAGE AND RETRIEVAL SYSTEM

BACKGROUND OF THE INVENTION

Existing storage systems such as cores, drums, discs, as well as photographic film, combine reasonably high density storage with random access facilities, however at the cost of loss in access speed or in volumetric efficiencies due to the fact that spatial requirements per bit of storage are very high. With the advent of improved techniques in holography, greater volumetric efficiencies have been achieved, but overall efficiencies in speed of access have not been fully realized due to a corresponding lack of improvements in the accessing facilities. Present techniques being investigated, using a laser light source, appear to suffer from either lack of access speed or place demands on a complex optical arrangement.

OBJECTS

The principal object of the invention is to overcome the cited disadvantages in the prior art by providing a high volume storage retrieval system with fast random access which is superior and more economical than prior art systems.

Another object is to provide a highly sophisticated storage retrieval system having high storage densities with fast access at relatively low cost.

A still further object is to provide a highly reliable storage retrieval system having a high density storage element consisting of a plurality of discrete reflective type holograms all arranged on a common surface and selectively accessed by a unique readout arrangement employing the Kerr magneto-optic effect.

The foregoing and other objects, features and advantages of the invention will be apparent from the following more particular description of preferred embodiments of the invention, as illustrated in the accompanying drawings.

EMBODIMENT OF THE INVENTION

Figures 1, 2:
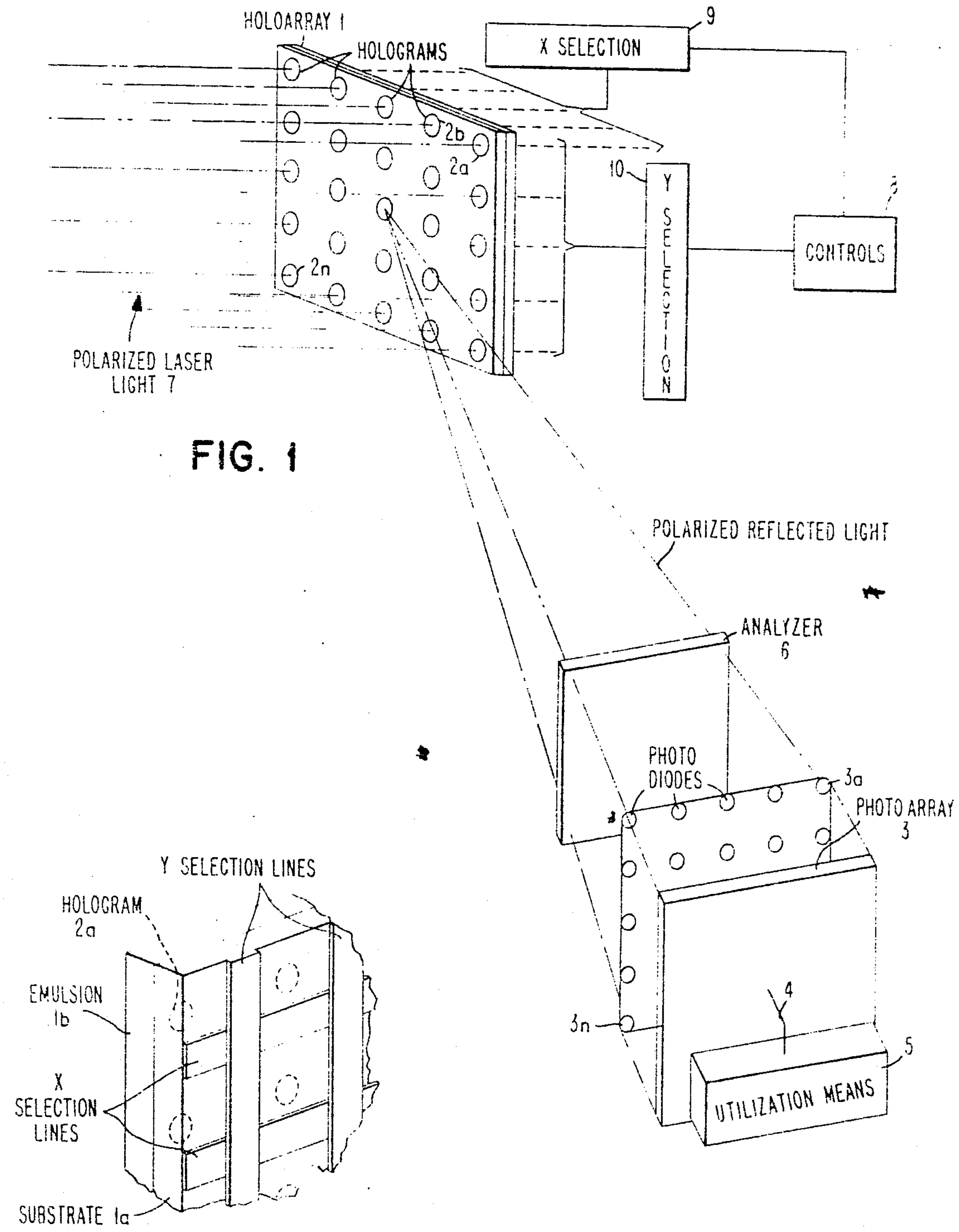
FIG. 1 shows an arrangement of the principal elements, including a holoarray employing reflective type holograms, constituting the holographic storage and retrieval system.
FIG. 2 is a detail of the holoarray.

Referring to FIGS. 1 and 2, the principal storage element is a holographic array, 1, comprised of a flat substrate 1*a*, glass or the like, one surface of which is comprised of a suitable photographic emulsion 1*b*. In discretely spaced areas 2*a*–2*n* of the emulsion there are contained the holographically stored information. Overlaying the discrete holograms 2*a*–2*n* are isolated magnetic films such as nickel-iron (permalloy) or the like. On the opposite surface of the substrate, conducting *x* and *y* coordinate lines are evaporated orthogonal to each other and insulated from each other by means of a film of silicon oxide (or similar insulating type film). The intersection of the *x* and *y* lines are substantially coincident with the location of the magnetic film on the opposite surface.

The array may be fabricated by the following procedure: A photographic emulsion is exposed, by well-known techniques, to produce discrete holograms. This implies the normal photographic technique or a computer-generated process. Furthermore, it implies the use of carrier frequency holograms or the more efficient type, currently referred to as kinoforms. Subsequent to the recording of the holographic information, the emulsion is bleached to produce a relief height variation that is a function of the exposure (by the incident light). By means of techniques well known in the art, magnetic films are thereafter overlaid on the discrete holograms. During this process a magnetic field is applied to induce uniaxial anisotropy to provide a preferred axis of orientation.

An alternative technique to circumvent the use of the emulsion may be employed in which the *x* and *y* coordinate lines, orthogonal to each other, and insulated from each other, are deposited upon the glass substrate. Thereupon and at the points of intersection, magnetic films are deposited in the presence of a magnetic field. The magnetic film is then selectively "etched" to produce the necessary relief height variation. The etching process may employ a suitable photochemical technique in which the depth of etch is related to the intensity of the holographic exposure. Alternatively, a programmable electron beam may be utilized to selectively remove a portion (in depth) of the metallic layer.

Although nickel-iron has been suggested as a possible reflecting surface, it is well known in the state of the art that the Kerr rotation (i.e., rotation of the plane of polarization) is slight. Therefore, a more suitable material must be employed to enhance this effect. The enhancement (of rotation) may be obtained by subsequently coating the nickel-iron film with a ferromagnetic semiconductor, for example, Europium chalcogenide in the manner described in detail in U.S. Pat. No. 3,475,738 assigned to the common assignee.

Referring to the drawing, a diode array 3 consisting principally of photosensitive diodes 3*a*–3*n*, are suitably arranged in a matrix by techniques well known in the art. The array is disposed in spatial relation to the holoarray 1 to receive light patterns reflected from any selected hologram in the array. The photosensitive diodes 3*a*–3*n* are appropriately biased to issue a relatively low output signal when no light energy is incident thereon, or a relatively high output signal when light energy is incident thereon (i.e., polarized light energy reflected from said array 1). By means of suitable electrical connections, each diode output is transmitted (schematically shown by way of line 4) to a utilization means 5 which may be any of several processing units for modifying and processing said data pattern signals.

Placed between said holoarray 1 and diode array 3 is an analyzer 6 so spatially disposed as to have its plane of polarization oriented at 90° relative to the plane of polarization of the polarized light reflected from the holoarray 1 during conditions when no readout is desired. Under conditions of readout a rotation in the plane of polarization of the reflected light permits the latter to pass through the analyzer and be directed upon selected ones of the diodes 3*a*–3*n* in the diode array.

In the operation of the system, a beam of polarized light 7 is made sufficiently broad to fully illuminate the entire holoarray surface and during a condition of no readout the light reflected from said array 1 has its plane of polarization oriented at 90° relative to the polarization axis of the analyzer 6 with the result that little or substantially no light reaches the photodiode array 3. However, during a readout, a control means 8 supplies desired selection voltage signals to an *x* selection means 9 and a *y* selection means 10 electrically interconnected between said control means 8 and the *x*–*y* coordinate drive lines on said holoarray 1. By means of the selection control, a desired pair of *x* and *y* coordinate drive lines are supplied with drive signals to cause the magnetization vector of a desired hologram, influenced by the selected pair of *x*–*y* coordinate drive lines, to be reversed for a readout of its coded information pattern. The reversal of the magnetization vector causes a narrow portion of the main beam 7 incident upon and reflected from the selected hologram to have its plane of polarization rotated such that a component of its light vector corresponds with the axis of polarization of the analyzer, and hence allowing the latter to pass the narrow reflected polarized beam and reach selected ones of the photosensitive diodes in the diode array 3.

While the invention has been particularly shown and described with reference to a preferred embodiment thereof, it will be understood by those skilled in the art that the foregoing and other changes in form and details may be made therein.

What is claimed is:

1. A storage retrieval system comprising:

a holoarray constituted of a plurality of discrete spaced-apart holograms of the reflective type;

a source of coherent energy for issuing a broad beam of coherent polarized light of sufficient cross section to fully illuminate said holoarray;

a diode array comprised of a matrix of light responsive diodes arranged to receive light reflected from any hologram in said holoarray; and an analyzer disposed intermediate said arrays and in the path of the reflected light to control the intensity of said reflected light incident upon said diode array.

2. A system as in claim 1 in which the plane of polarization of said analyzer is oriented at approximately 90° relative to the plane of polarization of the light reflected from said holoarray so to provide maximum extinction of said reflected light during a no readout condition.

3. A system as in claim 2 in which said holograms are each further characterized by exhibiting the magneto-optic effect, whereby the vector of magnetization of each hologram is switchable from a first state to a second state to cause rotation in the plane of polarization of the light reflected from a selected hologram, and a coordinate switching means disposed on said holoarray for causing a desired one of said holograms to exhibit said effect during a readout condition.

4. A system as in claim 3 in which each hologram contains a unique pattern representing digital or analog data and said diode array is arranged to provide electrical output signals, corresponding to each unique pattern, in response to the reception of a reflected light pattern when a desired hologram is selected under control of said coordinate switching means to provide a readout of said stored data.

5. A system as in claim 4 further including data processing utilization means responsive to said electrical signals read out from said diode array.

6. A system as in claim 5 in which said switching means is comprised of $x$–$y$ coordinate electrical conducting lines bonded to the surface opposed to the surface bearing the holograms, and control means therefore to effect at least two holograms to be simultaneously selected to issue their respective light patterns during a readout.

* * * * *